United States Patent [19]
Feldmeier

[11] Patent Number: 5,920,886
[45] Date of Patent: Jul. 6, 1999

[54] ACCELERATED HIERARCHICAL ADDRESS FILTERING AND TRANSLATION USING BINARY AND TERNARY CAMS

[75] Inventor: David C. Feldmeier, Morristown, N.J.

[73] Assignee: Music Semiconductor Corporation, Hackettstown, N.J.

[21] Appl. No.: 08/818,073

[22] Filed: Mar. 14, 1997

[51] Int. Cl.[6] .................................................. G06F 12/10
[52] U.S. Cl. ........................... 711/108; 711/206; 365/168
[58] Field of Search .................................... 711/108, 206, 711/207, 202; 365/49, 168; 326/59

[56] References Cited

U.S. PATENT DOCUMENTS

| | | | |
|---|---|---|---|
| 5,329,618 | 7/1994 | Moati et al. ............................. | 395/200 |
| 5,386,413 | 1/1995 | McAuley et al. ......................... | 370/54 |
| 5,414,704 | 5/1995 | Spinney ................................... | 370/60 |
| 5,422,838 | 6/1995 | Lin .......................................... | 365/49 |
| 5,568,415 | 10/1996 | McLellan et al. ....................... | 365/49 |

*Primary Examiner*—Eddie P. Chan
*Assistant Examiner*—Kevin Verbrugge
*Attorney, Agent, or Firm*—Skjerven, Morrill, MacPherson Franklin & Friel; Alan H. MacPherson; Fabio E. Marino

[57] ABSTRACT

A method and apparatus are provided for performing hierarchical address translation by translating each ternary hierarchical address into a binary address and a binary priority mask and storing the binary addresses in the binary CAM. A binary search of the priority masks is then performed by searching the CAM with a priority mask and choosing a next priority mask depending on the results of the search of the CAM until a correct matching entry (i.e., the matching entry with the lowest hierarchical level) is found. This technique only requires $\log_2 N$ searches of the CAM, where N is the number of hierarchical levels represented by the priority field. A method and apparatus are also provided for performing hierarchical address translation by storing table entries including a priority field in a ternary CAM and performing only a fixed number of searches of the CAM. Finally, a method and apparatus are provided for storing a translated hierarchical address in a cache CAM and using the cache CAM to perform successive hierarchical address translations.

16 Claims, 16 Drawing Sheets

| ENTRY | NUMBER | ROUTING DESTINATION |
|---|---|---|
| A | 908 979 XXXX | STATION NUMBER |
| B | 908 852 XXXX | CENTRAL OFFICE 852 |
| C | 908 XXX XXXX | 908 TANDEM SWITCH |
| D | XXX XXX XXXX | LONG DISTANCE POINT-OF-PRESENCE |

FIG. 2A (PRIOR ART)

| ENTRY | NUMBER | NUMBER | ROUTING DESTINATION |
|---|---|---|---|
| A | 908 XXX XXXX | | EXAMINE LIST THAT FOLLOWS |
| A.a | | 908 979 XXXX | STATION NUMBER |
| A.b | | 908 852 XXXX | CENTRAL OFFICE 852 |
| A.c | | 908 XXX XXXX | 908 TANDEM SWITCH |
| B | XXX XXX XXXX | XXX XXX XXXX | LONG DISTANCE POINT-OF-PRESENCE |

FIG. 2B (PRIOR ART)

| ENTRY | NUMBER | LEVEL | ROUTING DESTINATION |
|---|---|---|---|
| A | 908 979 XXXX | 3 | STATION NUMBER |
| B | 908 852 XXXX | 3 | CENTRAL OFFICE 852 |
| C | 908 XXX XXXX | 2 | 908 TANDEM SWITCH |
| D | XXX XXX XXXX | 1 | LONG DISTANCE POINT-OF-PRESENCE |

FIG. 2C (PRIOR ART)

| ENTRY | NUMBER | ADDRESS (BINARY) | MASK (BINARY) |
|---|---|---|---|
| A | 11110X00 | 11110000 | 11111011 |
| B | 11X10X00 | 11010000 | 11011011 |
| C | 1X111X00 | 10111000 | 10111011 |
| D | 1XXXXX00 | 10000000 | 10000011 |

FIG. 4A (PRIOR ART)

| ENTRY | NUMBER | ADDRESS (BINARY) | MASK (BINARY) |
|---|---|---|---|
| A | 111101XX | 11110100 | 11111100 |
| B | 11110100 | 11110100 | 11111111 |

FIG. 4B (PRIOR ART)

| ENTRY | NUMBER | ADDRESS (BINARY) | MASK (BINARY) |
|---|---|---|---|
| A | 8C FC 0D 23 | 8C FC 0D 23 | FF FF FF FF |
| B | 8C FC 0D XX | 8C FC 0D 00 | FF FF FF 00 |
| C | 8C FC 5X XX | 8C FC 50 00 | FF FF F0 00 |
| D | 8C FC XX XX | 8C FC 00 00 | FF FF 00 00 |

FIG. 6A

| ENTRY | ADDRESS (BINARY) |
|---|---|
| 0 | 8C FC 00 00 |
| 1 | 8C FC 50 00 |
| 2 | 8C FC 0D 00 |
| 3 | 8C FC 0D 23 |

FIG. 6B

| ADDRESS MASK | CAM MASK | MATCHING ENTRIES |
|---|---|---|
| 610 — FF FF F0 00 | 00 00 0F FF | 0, 2, 3, (MULTIPLE MATCHES) |
| 620 — FF FF FF 00 | 00 00 00 FF | 2, 3 (MULTIPLE MATCHES) |
| 630 — FF FF FF FF | 00 00 00 00 | 3 (CORRECT MATCHING ADDRESS) |

FIG. 6C

| ADDRESS MASK | CAM MASK | MATCHING ENTRIES |
|---|---|---|
| 610 — FF FF F0 00 | 00 00 0F FF | 0, 2, 3, (MULTIPLE MATCHES) |
| 620 — FF FF FF 00 | 00 00 00 FF | 2, 3 (MULTIPLE MATCHES) |
| 630 — FF FF FF FF | 00 00 00 00 | (NO MATCHING ADDRESS) |

FIG. 6D

| ADDRESS MASK | CAM MASK | MATCHING ENTRIES |
|---|---|---|
| 610 — FF FF F0 00 | 00 00 0F FF | 1 (CORRECT MATCHING ADDRESS) |

FIG. 6E

| ADDRESS MASK | CAM MASK | MATCHING ENTRIES |
|---|---|---|
| 610 — FF FF F0 00 | 00 00 0F FF | (NO MATCHING ADDRESS) |
| 640 — FF FF 00 00 | 00 00 FF FF | 0, 1, 2, 3 (MULTIPLE MATCHES) |

FIG. 6F 5,920,886

ACCELERATED HIERARCHICAL ADDRESS FILTERING AND TRANSLATION USING BINARY AND TERNARY CAMS

BACKGROUND OF THE INVENTION

1. Field of the Invention

The present invention relates generally to data communication networks and, in particular, to a method and apparatus for performing accelerated hierarchical address filtering and translation.

2. Description of Related Art

Address translation is the process of mapping an address, such as the network address contained in a packet, to some desired information. Examples of desired information include determining the output port of a switch to which a packet is to be sent and determining the address of the next-hop router for the routing of Internet Protocol (IP) datagrams. Address filtering is a process similar to address translation, except that rather than retrieving the data associated with an address, the process simply determines whether the address exists in a table of addresses. The term address translation, as used herein, includes both address translation and address filtering operations.

With respect to routing, addresses can be categorized as either flat addresses or hierarchical addresses. FIGS. 1A–1B illustrate examples of flat and hierarchical addresses. Flat addresses are addresses that have no internal structure that can be used in protocol processing of the address. Ethernet address 110 of FIG. 1A is an example of a flat address. Although Ethernet addresses have a structure (e.g., one part of the address denotes the manufacturer of the equipment using that address), that structure is not relevant to protocol processing operations, such as routing. Many techniques have been developed for accelerating flat address translation. As these techniques are well known to those skilled in the art, they are not further discussed herein.

Hierarchical addresses are addresses that have an internal structure that can be used in protocol processing of the address. Examples of hierarchical addresses include Internet Protocol (IP) v.4 addresses, IP v.6 addresses, E.164 addresses (used in ATM network protocol processing), and telephone numbers.

Telephone number 120 of FIG. 1B is used to illustrate the internal structure of a hierarchical address. Consider telephone number 120. The highest level of the hierarchy is denoted by area code 130, which is used to identify telephone numbers in area 135. The next level of hierarchy is central office code 140, which is used to identify telephone numbers in central office zone 145. The lowest level of the hierarchy is station number 150, which identifies the specific telephone subscriber 155 among those serviced by the station for central office zone 145.

The hierarchical structure of a telephone number is used when determining how to route a call through the telephone network. For example, if a call both originates and terminates in central office zone 145 (i.e., both the source and the destination numbers have central office code 140), then the telephone call passes only through the central office for central office zone 145. If a call both originates and terminates in area 135 (i.e., both the source and destination numbers have area code 130), no long-distance carrier is used to carry the call. Note that a flat address can be viewed as a hierarchical address with a single level of hierarchy. Thus, any address translation technique that operates on hierarchical addresses can also be applied to flat addresses.

Hierarchical addresses allow for processing of addresses without the need for storing information about all addresses to be processed. Information about entire classes of addresses is stored in a single entry. For example, if a call originates within area 135 and terminates in an area having a different area code, the correct action is to forward the call to a long distance carrier, regardless of the area code of the destination telephone number. Thus, a single entry in the table determines the handling of any telephone call to an area code other than area code 130.

In order to translate a specific telephone number into an action to be performed in the protocol processing of a call, a look-up table is used to store various hierarchical addresses, each corresponding to a specific action to be taken in routing the call.

FIG. 2A illustrates a typical prior art routing table used to route calls originating in area 135. In FIG. 2A, entry A represents a hierarchical address that matches all telephone numbers in the "908" area code and the "979" central office code. This is accomplished by inserting don't care (X) values into the entries to indicate any valid value in the corresponding digit of the address compared to the entry. In other words, table entry "908-979-XXXX" matches all telephone numbers between "908-979-0000" and "908-979-9999". Likewise, entry B represents all telephone numbers in the "908" area code and the "852" central office code. Entry C, in turn, represents all telephone numbers in the "908" area code regardless of their central office code. Finally, entry D represents all long distance telephone numbers. Any telephone number that is compared to the table entries matches one or more entries in the table (since all telephone numbers match entry D). For the table to operate correctly, however, it is necessary for the correct matching entry to be returned. The correct matching entry is the one at the lowest hierarchical level (i.e., the entry with the fewest X's).

For example, if the table is searched for the (908) 979-1035 telephone number, the matching entries are A, C and D. However, entry A is the correct matching entry having the lowest hierarchical rank and thus allowing for the most specific action (i.e., placing the call within the central office).

Current methods for translating hierarchical addresses are implemented in software and use tree structures, such as PATRICIA trees. PATRICIA trees are described on pages 481–493 of "The Art of Computer Programming, Vol. 3: Searching and Sorting" by Donald E. Knuth (Reading, Mass.: Addison Wesley, 1973), which is herein incorporated by reference in its entirety. FIG. 2B illustrates a switching table 200 which uses a PATRICIA tree to route calls originating in central office zone 145.

Telephone numbers are compared with table entries in order from top to bottom looking for a matching entry. The telephone number is first compared to entry A. If the area code of the telephone number is "908," subentries A.a, A.b and A.c are searched; otherwise the telephone number is compared to entry B, the long distance point-of-presence entry, which matches all telephone numbers.

This approach, however, is limited by the constraints of a software implementation: processing speed is typically slower than in equivalent hardware implementations and comparisons with table entries are typically performed in a sequential order.

Several techniques that utilize content addressable memories (CAMs) for searching a routing table are discussed in "Fast Routing Table Lookup Using CAMs" by Anthony J. McAuley and Paul Francis (1993 INFOCOM Proceedings)

[hereinafter "the McAuley article"], which is herein incorporated by reference in its entirety. Prior art techniques, such as those described in the McAuley article, are summarized in FIGS. 3A–3C.

A content addressable memory (CAM) is a memory device that allows retrieval of information by specifying part of the stored information rather than by specifying a storage address. For example, if an entry "abcd" were stored in a CAM, the CAM could be instructed to return the complete contents of all locations containing "ab". CAMs are sometimes referred to as associative memories.

CAMs are generally classified as either binary or ternary CAMs. Binary CAMs store binary entries, while ternary CAMs store ternary entries. Binary entries are entries that contain only 0 or 1 values, while ternary entries are entries that contain 0, 1 or X (i.e., "don't care") values. Note that a single ternary entry can be expressed as two or more binary entries. In other words, a single ternary entry "1X0" can be represented by two binary entries "110" and "100", or a single ternary entry "1XX" can be represented by four binary entries "100", "101", "110" and "111", etc. As hierarchical addresses often comprise ternary values (e.g. "908-979-XXXX"), ternary CAMs require a smaller number of table entries to represent each hierarchical address than binary CAMs. However, ternary CAMs require more complex hardware and are generally more expensive than binary CAMs.

CAMs may be implemented using a variety of techniques and technologies. One common technique is to search all CAM entries simultaneously in parallel to find the desired entry. Other techniques include hardware implementations of techniques commonly associated with software, such as hashing, serial search, binary search, and various search techniques based on a tree data structure. As these techniques are well known to those skilled in the art, they are not further discussed herein.

The advantages of using CAMs for hierarchical address translation are higher performance and better price/performance ratio than using existing techniques.

A first prior art technique relies on the intrinsic priority encoding of entries stored in a CAM. Since the order in which entries are retrieved from a CAM can be predicted based on the location of the entries, address routing operations can be implemented by first storing the addresses in the table into the CAM in a given order and then searching the table for the address, as shown in FIG. 3A. In FIG. 3A, the addresses are first stored in the CAM in reverse hierarchical order in stage 310. The CAM is then searched for the address in stage 320. Since the entries are returned in reverse hierarchical order, the first matching entry returned by the search is the one with the lowest hierarchical rank, which is also the correct matching entry.

This technique, however, is not very useful in practice since it requires all the entries in the CAM to be sorted every time a new entry is added to preserve the inverse hierarchical ordering. To remedy this problem, the McAuley article proposes adding a priority field to table entries, as shown in FIG. 2C. FIG. 2C illustrates the table of FIG. 2A augmented by a priority field added to each entry. The priority field is used to represent the hierarchical order of the entries and allows the CAM to be searched in hierarchical order without requiring all entries to be re-sorted when a new entry is added to the CAM. For example, in FIG. 2C, entry D, which matches all telephone numbers, has the highest hierarchical level 1.

While hierarchical addresses can be directly stored in ternary CAMs, in order to be stored in binary CAMs they must first be translated into binary format. As discussed above, a ternary address can be translated into two or more binary addresses. However, the number of binary addresses needed to represent a ternary address is $2^m$ where m is the number of don't care digits in the ternary address. For example, ternary address "908-979-XXXX" would be translated into 10,000 binary addresses, "908-979-0000" through "908-979-9999". As the cost of CAMs is dependent on the number of entries they can store, the number of binary addresses needed to represent large hierarchical addresses renders this solution undesirable.

To solve this problem, the McAuley article proposes translating a ternary hierarchical address into a binary address and a binary priority mask, as shown in FIG. 4A. The binary address has a 1 in the positions in which the ternary address has a 1, and 0s in the other positions. The mask contains a 0 in the positions in which the ternary address has an X, and 1s in the other positions. As a result, each bit in the binary address, together with a corresponding bit in the priority mask, accurately indicates the value of a corresponding bit in the ternary entry, as shown in FIG. 4A. The binary addresses are stored in the CAM, while the binary masks indicate which bits of the stored addresses are compared to the search address during searches of the CAM. As only one binary address is generated for each ternary address, the size of the CAM is greatly reduced.

In order for values to be correctly stored in the binary CAM, ternary addresses must be translated into unique binary addresses. FIG. 4B, for example, shows two ternary entries that generate the same binary address, albeit with different masks. If more than one ternary value is translated into a single binary address stored in the CAM, only one set of data can be stored in the CAM (in the location of the binary address) and thus only one ternary address can be correctly translated. This problem is remedied by treating certain ternary values as invalid to ensure that all ternary values are translated into unique binary addresses. For example, in IP v.4, 0 is not a legal value for the lowest level of the hierarchical address.

A second prior art technique consists of searching a binary CAM for portions of an address specified by a priority mask, as shown in FIG. 3B. In FIG. 3B, a binary CAM is first searched for a binary address using a binary priority field at the lowest hierarchical level (i.e., the most specific hierarchical level) in stage 340. Stage 345 then determines whether the search found any matching entries, in which case the first of the matching entries is retrieved in stage 355; otherwise the CAM is searched again for the same address and a priority field at the next higher hierarchical level. The first matching entry is the correct matching entry, as it has the lowest hierarchical level of any matching entry.

This technique, however, requires in the worst case a search for each hierarchical level of the entries in the CAM.

A third prior art technique, therefore, uses a ternary CAM in place of a binary CAM to reduce the number of searches of the CAM needed in the worst case to find a matching entry. A ternary CAM is a binary CAM that can handle "don't care" values (represented by the symbol X) which match both 1 and 0 values. This technique is illustrated in FIG. 3C. Unlike with binary CAMs, ternary addresses are stored in the ternary CAM together with the corresponding binary priority fields representing the hierarchical level of the addresses. The ternary CAM is then searched with an address to be translated and a priority field in which all bits, except for the most significant bit, have a don't care value. After each search, a don't care bit of the priority field is replaced by a 1 or a 0 (as explained below), until a binary priority field is obtained. An entry matching the address and the binary priority field is the correct matching entry.

In FIG. 3C, the ternary CAM is first searched for an address and a priority field having a 1 in the most significant bit position and an X in all other bit positions, in stage 360. Stage 365 then determines if there are any matching entries, in which case the operation proceeds to stage 375; otherwise the least significant bit in the priority field having a value of 1 is replaced by a value of 0. Stage 375 then determines whether any bits of the priority field have a value of X, in which case the most significant bit in the priority field having a value of X is replaced by a value of 1 in stage 380. The CAM is then searched for the address and the modified priority field, in stage 385. Stage 390 determines whether there is a single matching entry, in which case the matching entry is retrieved from the CAM in stage 395; otherwise stages 365–390 are repeated until the test of stage 390 is satisfied and the operation terminates. Thus, one X is resolved (i.e. replaced by a 1 or a 0) after each search until a matching entry is found.

This technique requires in the worst case a number of searches equal to the number of bits used to represent the priority field (i.e., if N is the number of hierarchical levels represented by the priority field, $\log_2 N$ searches are required to find a matching entry at the lowest hierarchical level, as all bits of the priority mask must be resolved).

There is thus a need for an improved method and apparatus for performing fast hierarchical address translation.

SUMMARY

The invention provides methods and apparata for performing hierarchical address translation using either binary or ternary CAMs which require a lower number of searches of the CAM than prior art techniques.

In particular, a method and apparatus are provided for translating a ternary hierarchical address using a binary CAM that require in the worst case only $\log_2 N$ searches of the CAM, where N is the number of hierarchical levels of the hierarchical address, and only requires one entry to be stored in the CAM for each hierarchical address. Prior art techniques for translating hierarchical addresses using a binary CAM either require N searches of the CAM to be performed in the worst case or multiple table entries to be stored in the CAM for each hierarchical address.

This is achieved by translating each ternary hierarchical address into a binary address and a binary priority mask and storing the binary addresses in the binary CAM. A binary search of the priority masks is then performed by searching the CAM with a priority mask and choosing a next priority mask depending on the results of the search of the CAM until a correct matching entry (i.e., the matching entry with the lowest hierarchical level) is found.

A further method and apparatus are provided for performing hierarchical address translation using a ternary CAM that require only a fixed number (2, or 1 when pipelined) of searches of the CAM, independent of the number of hierarchical addresses or of the number of hierarchical levels of the address. Prior art techniques for translating hierarchical addresses using ternary CAMs require in the worst case $\log_2 N$ searches of the CAM.

This is achieved by storing a ternary address and a priority field representing a hierarchical level of the ternary address in a ternary CAM, searching the CAM for an address to be translated, comparing the priority fields of all addresses stored in the CAM that match the address to determine which matching entries have the highest hierarchical level, and searching the CAM for the address and the priority field having the lowest hierarchical level of all matching entries generated by the first search. Thus, the number of searches of the CAM required to translate an address is always 2 (1 if the searches are pipelined) regardless of the number of addresses stored in the CAM or of the number of hierarchical levels represented by the priority field.

A method and apparatus are also provided for performing hierarchical address translation using a memory and a CAM that require only a single search of the memory once the address has been translated using the CAM. This is achieved by storing a hierarchical address translated using the CAM in the memory and using the memory to perform successive hierarchical address translations. Unlike prior art techniques that required multiple searches of the CAM, once the address has been translated, this technique only requires one search of the CAM for successive translations of that address.

As a result, the number of searches required to translate a hierarchical address using either binary or ternary CAMs is reduced and the performance of hierarchical address translation operations is improved. This is particularly advantageous in applications where fast network routing is critical, such as the routing of data packets in network switches.

BRIEF DESCRIPTION OF THE DRAWINGS

FIG. 2A illustrates a typical prior art routing table used to route calls originating in a calling area.

FIG. 2B illustrates a switch which uses a PATRICIA tree to route calls originating in a central office zone.

FIG. 2C illustrates the table of FIG. 2A augmented by a priority field added to each entry.

FIG. 4A illustrates multiple prior art ternary entries of a switching table and their respective encoding as pairs of binary addresses and binary masks.

FIG. 4B illustrates two ternary entries of a switching table that are encoded as a same binary address, but different binary masks.

FIG. 6A illustrates multiple entries of an IP routing table used in an hierarchical address translation operation, according to one embodiment of the invention.

FIG. 6B shows the order in which the table entries of FIG. 6A are stored in a CAM.

FIGS. 6C–6F illustrate the results produced by successive searches of the CAM for various addresses during the hierarchical address translation operation of FIG. 5.

DETAILED DESCRIPTION OF THE PREFERRED EMBODIMENTS

According to the embodiments of the invention, a content addressable memory is used to improve the performance of hierarchical address translation systems.

In one embodiment of the invention, ternary hierarchical address values are stored in a binary CAM by breaking the ternary address into two components: a binary address and a priority mask. The binary address has a 1 in the positions in which the ternary address has a 1, and 0s in the other positions. The mask contains a 0 in the positions in which the ternary address has an X, and 1s in the other positions. Some examples are shown in FIG. 4A.

Note that only the binary address values are stored in the CAM, while the masks are stored in a separate mask list. The list of mask values, sorted in hierarchical order, is used during searches of the CAM to find a desired address. The CAM uses the one's-complement of the address mask during searches. As discussed with reference to FIG. 4B, ternary addresses are translated into unique binary addresses.

Some prior art techniques employ a similar scheme to store hierarchical addresses in a binary CAM and to search the CAM for table entries matching an address using different priority masks. These methods, however, require, in the worst case, that the binary CAM be searched once for each priority mask in the list. By contrast, one embodiment of the invention provides a method of translating hierarchical addresses using a binary CAM that only requires $\log_2 N$ searches of the CAM, where N is the number of hierarchical levels of the address.

Figure 1A:
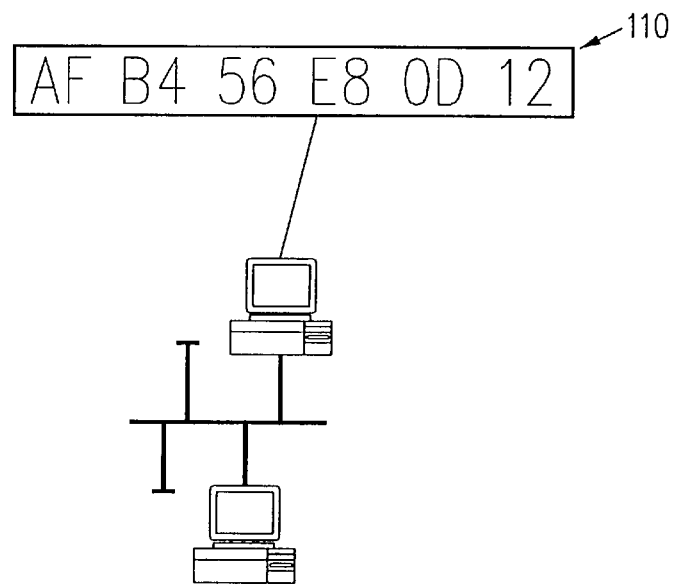
FIG. 1A illustrates an example of a prior art flat address.
Figure 1B:
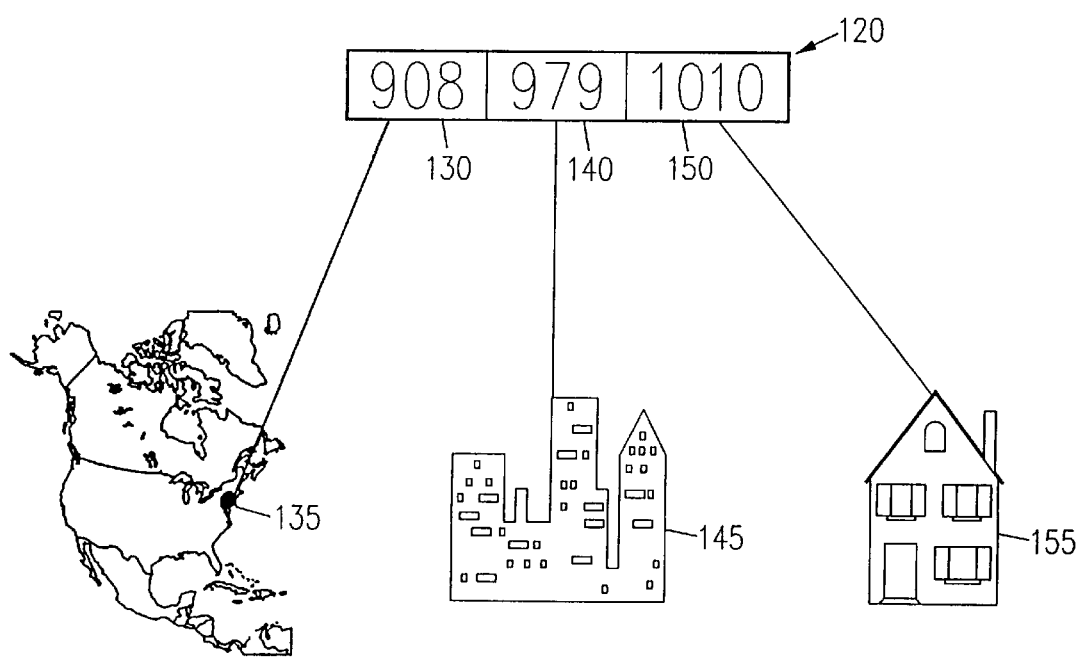
FIG. 1B illustrates an example of a prior art hierarchical address.
Figure 3A:
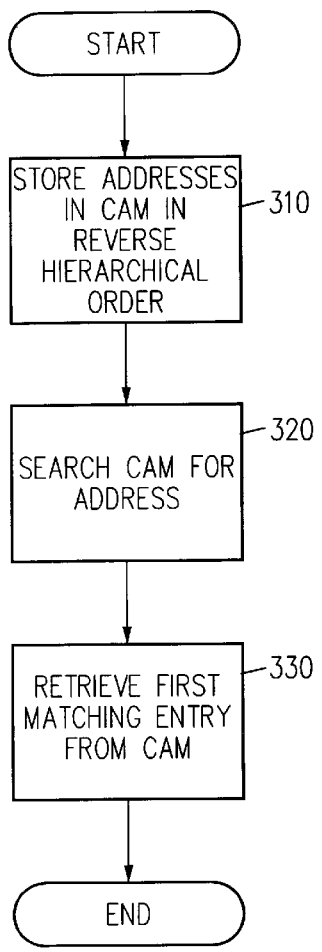
FIG. 3A is a flow diagram of a prior art technique for translating hierarchical addresses using a CAM.
Figure 3B:
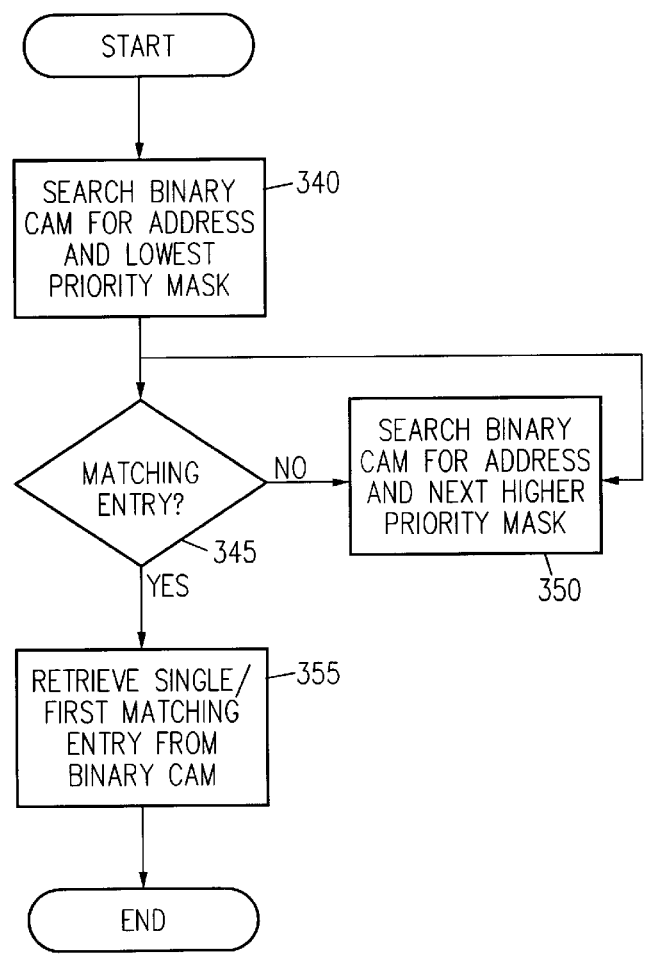
FIG. 3B is a flow diagram of a different prior art technique for translating hierarchical addresses using a binary CAM.
Figure 3C:
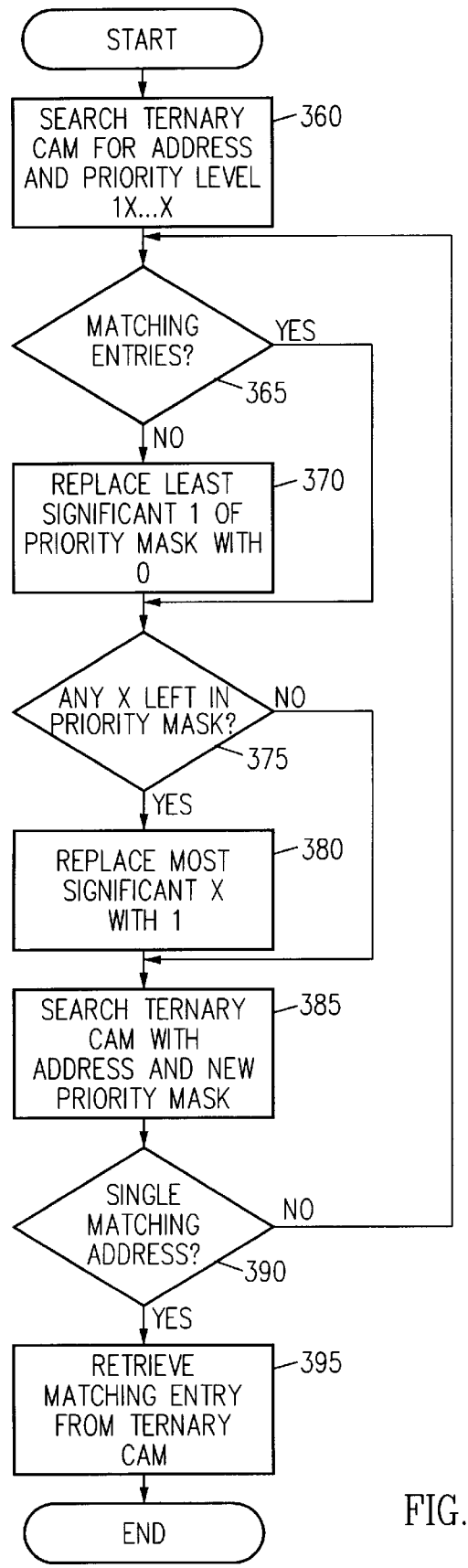
FIG. 3C is a flow diagram of yet another prior art technique for translating hierarchical addresses using a ternary CAM.
Figure 5:
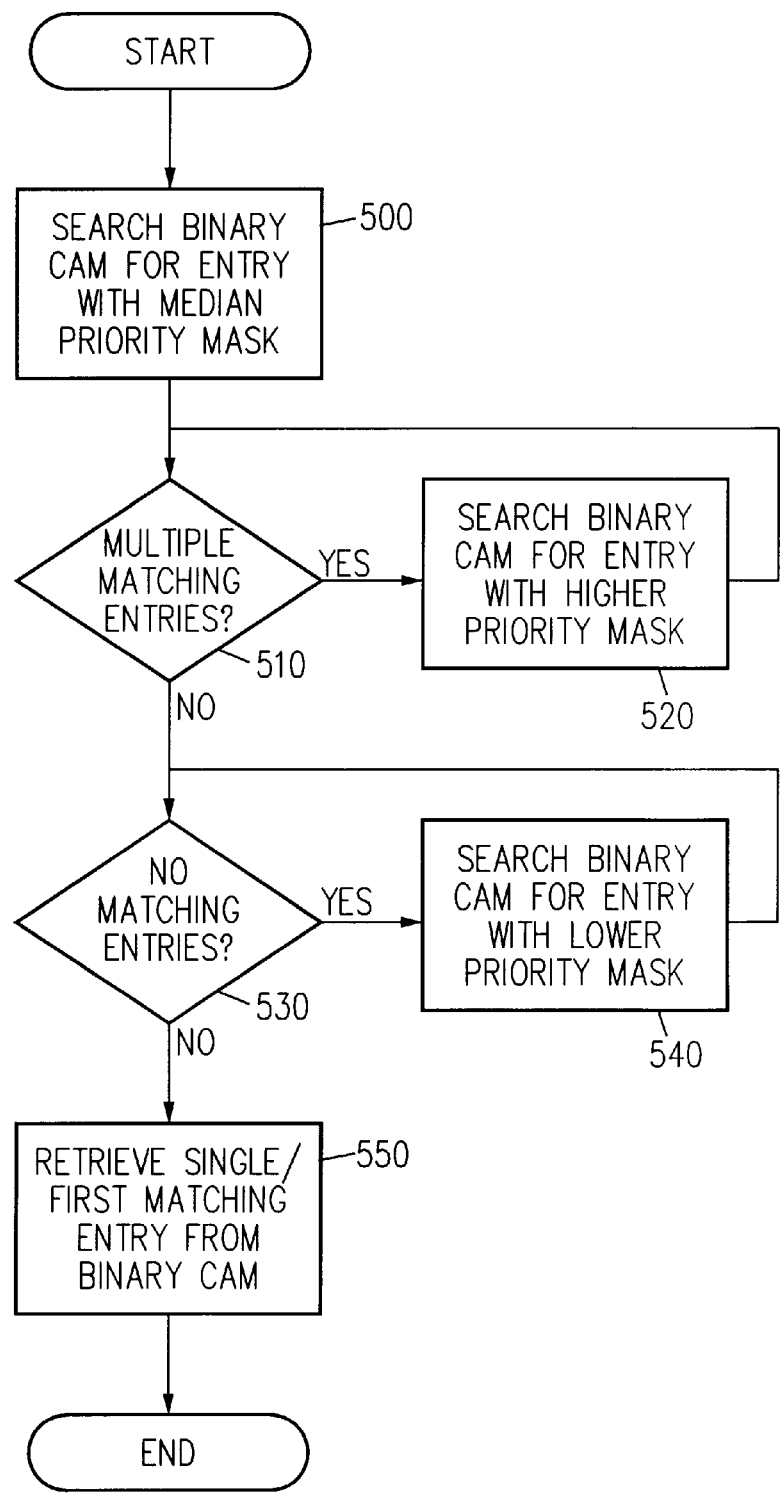
FIG. 5 is a flow diagram of a hierarchical address translation operation using a binary CAM, according to one embodiment of the invention.

This is accomplished by first ordering priority masks so that a mask with m trailing zeros is used in a search before a mask with n trailing zeros, where m<n. In addition, rather than searching for all priority masks in the mask list sequentially, as taught by the prior art, one embodiment of the present invention searches the CAM using a binary search technique, as shown in FIG. 5. Unlike in prior art techniques, in which priority masks are used in reverse hierarchical order so that the first matching entry is the correct matching entry, using a binary search the first matching entry may not be the correct matching entry. This is because the priority masks are not used in hierarchical order, but rather according to the their position in a binary search tree. As a result, if a search of the CAM produces multiple matching entries, the search is repeated with a priority mask with a higher hierarchical level until a single matching entry (or no matching entry, in which case the correct matching entry is the first matching entry generated by the previous search) is found.

Initially, the CAM is searched with a priority mask that has a median value of all masks in the list, in stage 500. Stage 510 then determines if more than a single match is found, in which case the mask of the desired address is in the first half of the list, and the CAM is searched again with a mask that has a median value of all masks in the first half of the list, in stage 520. Otherwise stages 510–520 are repeated until either a single match or no matches are found. Stage 530 then determines whether the search produced no matches, in which case the mask of the desired addresses is in the second half of the list, and the CAM is searched with a mask that has a median value of all masks in the second half of the list, in stage 540. Otherwise stages 530–540 are repeated until at least one matching entry is found. The matching entry is then retrieved from the CAM in stage 550.

Note that in some cases a search that generated multiple matching entries is followed by a search that generates no matching entries. In this case, the desired entry is the first matching entry generated by the last search in which multiple matches were found. It is for this case that the order of CAM entries is important. Address entries are stored in the CAM such that the addresses with masks with the largest number of trailing zeros are stored first.

FIGS. 6A–6F illustrate an example of the a hierarchial address translation operation of FIG. 5 performed on an IP v.4 address. FIG. 6A shows four ternary entries that are to be stored in the CAM, along with their respective binary addresses and masks. For convenience, all entries in FIGS. 6A–6F are shown as hexadecimal, rather than binary, digits.

The binary entries are stored in the CAM in the order shown in FIG. 6B. Note that the address of entry D (FIG. 6A) which has the largest number of trailing 0s (four) is stored in the first location of the CAM, followed by the address of entry C which has the second largest number of trailing 0s (three), etc.

The incoming address is then compared to the binary entries stored in the CAM using a set of CAM masks. The CAM masks used are the one's-complement of the priority mask for which the search is performed. FIG. 6C illustrates the results of a search for address "8C FC 0D 23". First, the CAM is searched with mask 610, generating matches on entries 0, 2 and 3 (FIG. 6B). As the first search produced multiple matches, the search is repeated with mask 620, generating matches on entries 2 and 3. The search is repeated again with mask 630, generating a single matching entry, entry 3, which is the desired entry.

FIG. 6D illustrates the results of a search for address "8C FC 0D 42". The first two searches are analogous to the ones illustrated in FIG. 6C; however, the search with mask 630 generates no matching entries. Accordingly, the desired entry is the first matching entry returned by the previous search, namely entry 2.

FIG. 6E illustrates the results of a search for address "8C FC 53 42". Here, the first search with mask 610 produces a single matching entry, entry 1, which is also the desired entry.

Finally, FIG. 6F illustrates the results of a search for address "8C FC A3 42". Here, the first search with mask 610 produces no matching entries, therefore a second search is performed with mask 640, generating multiple matching entries, entries 0, 1, 2 and 3. Accordingly, the desired entry is the first matching entry, namely entry 0.

Figures 7, 8:
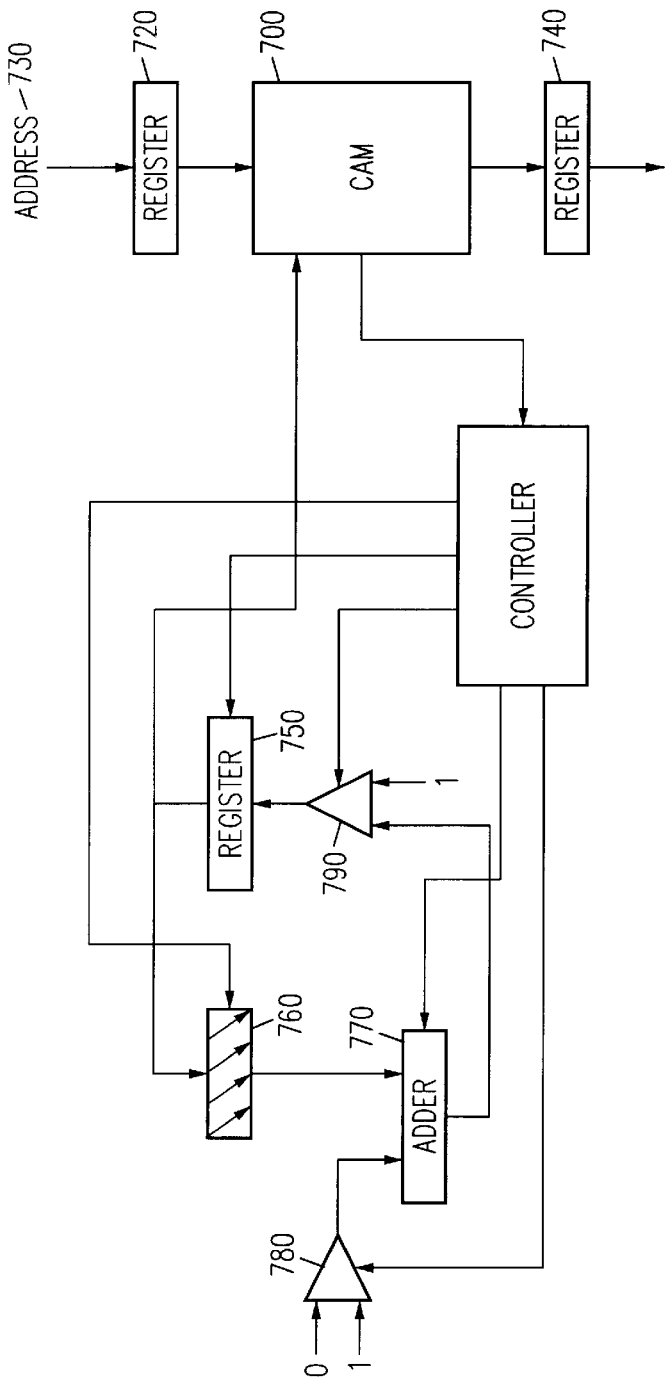
FIG. 7 is a schematic diagram of a circuit for performing the hierarchical address translation operation of FIG. 5.
FIG. 8 illustrates a plurality of ternary table entries augmented by an N-bit priority field, where N is the number of priority levels stored in the table, according to one embodiment of the invention.

The operation of FIG. 5 can be implemented by the circuit of FIG. 7. In FIG. 7, a circuit according to one embodiment of the present invention comprises a CAM 700 and a controller 710. Mask values for searching the CAM are stored in a sequential binary tree arrangement depending on their hierarchical level in a register bank of the CAM 700 to simplify the logic required to traverse the tree. Thus, the mask at the root of the tree (which has a median hierarchical level of all masks stored in the tree) is stored in the first register and all other masks are stored so that for each mask at a node of the tree stored in register n, its immediate descendants in the tree are stored in registers 2n and 2n+1, respectively. Accordingly, after each search the circuit generates an index for the register storing the next mask in the tree by multiplying the register index by two and adding either a one or a zero to that value. A register 720 holds a value of an address 730 that is compared to the entries stored in CAM 700. A register 740 holds a value of an entry read from CAM 700. Controller 710 receives input signals from CAM 700 over a bus and transmits control signals over separate buses to register 750, shifter 760, adder 770 and multiplexers 780 and 790. Register 750 is initially loaded with a one value to point to the first register of the CAM which stores a mask at the root of the tree (i.e., the mask having a median hierarchical level of all masks stored in the tree). The priority field is then routed to CAM 700. The contents of CAM 700 are then searched for a match on address 730 and the initial priority mask. If one or more matches are generated, the matching entry is stored in register 740. If more than one match occurs, the value of the priority mask index stored in register 750 is routed to shifter 760 and multiplied by two. Since the binary search tree is stored in sequential order, this operation has the effect of pointing the priority mask index to the next node of the binary search tree. The priority mask index value generated by shifter 760 is then routed to adder 770 together with an output of multiplexer 780, which is in turn connected to a logical one source, a logical zero source and is controlled by controller 710. Adder 770 then adds either a zero or a one to the priority mask index value generated by shifter 760 as necessary to generate a new priority mask index value which is then stored back into register 750, through multiplexer 790. Again, as the binary search tree is stored in sequential order, adding a zero or a one to the priority mask index has the effect of following one of the two branches at a node of the binary search tree. Multiplexer 790 is also connected to a logical one source and is controlled by controller 710.

Furthermore, a table of hierarchical addresses can be directly stored in a ternary CAM. Multiple CAM entries, however, may match the hierarchical address being translated. Generally, CAMs allow only a single match result to be read at any one time. To maximize the speed of address translation operations, it is desirable to have the first match result that is read from the CAM be the desired match result. Prior art techniques solve this problem by using a priority encoder provided by some CAMs to allow multiple matches to be read out one at a time. The priority encoder determines the order in which the matches are read from the CAM based on where the entry is stored in the CAM. Entries are written into the CAM in such a way that the desired entry is always the first entry read. With existing CAMs, this can be done by writing entries in inverse hierarchical order. Within a hierarchical level, the ordering of the entries is irrelevant because no more than one matching entry is found for any given level of the hierarchy. This approach, however, renders adding new entries to the CAM very time-consuming because of the need to maintain inverse hierarchical ordering.

To solve this problem, a priority field may be added to every entry stored in the ternary CAM. The priority field is used in searching the ternary CAM for an address. FIG. 8 illustrates four entries stored in a ternary CAM to which a priority field has been added to indicate a hierarchical level of the address.

Prior art techniques search a ternary CAM storing hierarchical addresses by performing a binary search of the priority fields. As is well known to those skilled in the art, however, a binary search requires in the worst case $\log_2 N$ searches, where N is the number of priority levels of the address. By contrast, in one embodiment of the present invention, the ternary CAM is pipelined to provide address resolution in a single cycle or, if no pipeline is used, in a fixed number of cycles independent of the number of priority levels of the address. This is accomplished by using N bits of the priority field to denote N levels of priority, searching the ternary CAM for the address, decoding the priority fields of the matching entries produced by the search to determine the highest priority field of any matching entries and the searching the ternary CAM a second time for the address and the highest priority field of the matching entries. If the two searches are pipelined, each search effectively requires a single cycle.

Figure 9:
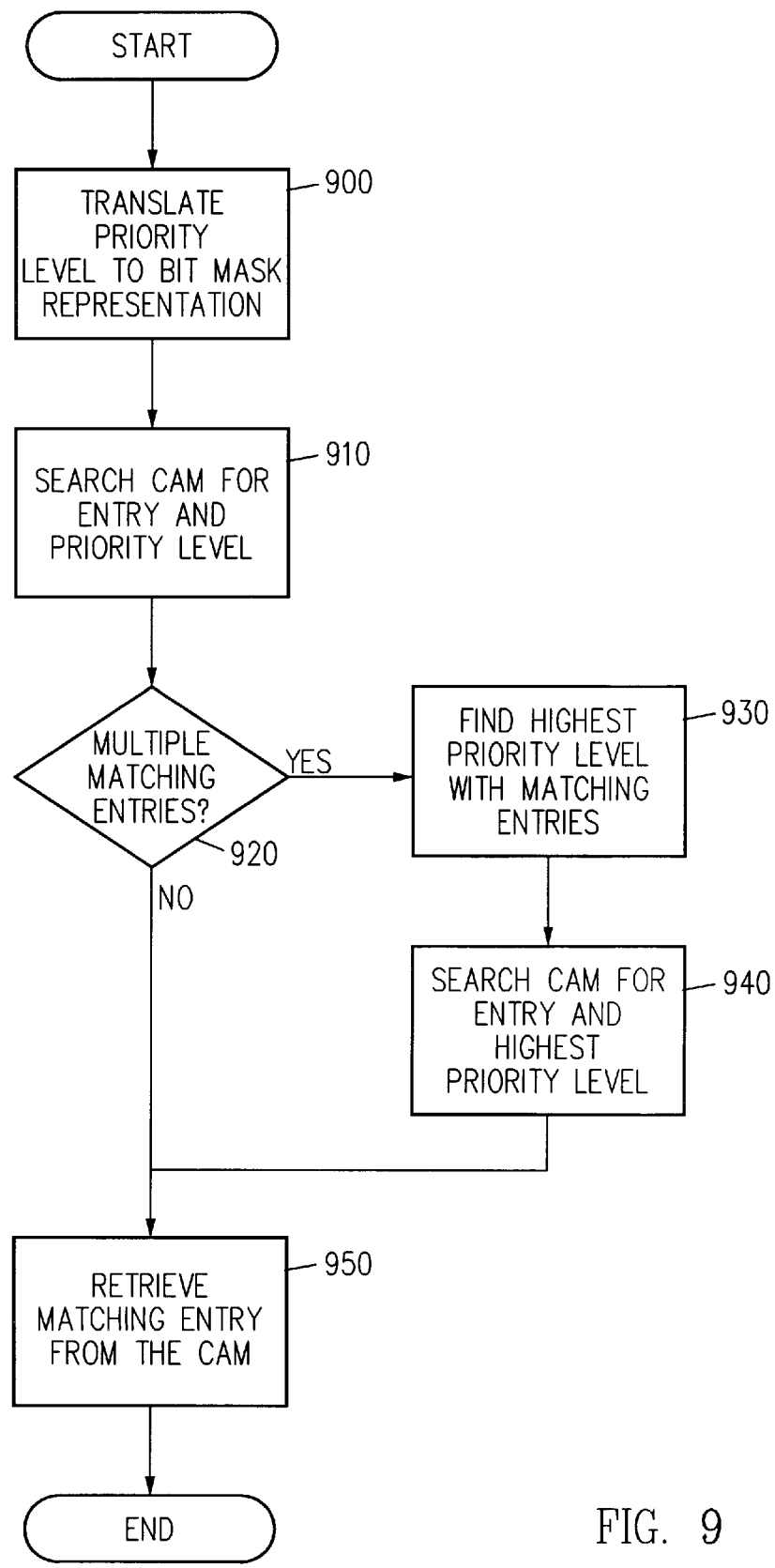
FIG. 9 is a flow diagram of an hierarchical address translation operation using a ternary CAM, according to one embodiment of the invention.

The process of searching the CAM for an address, such as telephone number (908) 979-1035, is illustrated in FIG. 9. First, the priority field is translated into a bit mask (a sequence of 0s and 1s in which each bit indicates whether an action is to be performed on a corresponding element of a sequence to which the mask is applied) representation where N bits of the priority field are used to represent N priority levels of the address in stage 900. Accordingly, each priority field has N bits, only one of which has a value of 1. In stage 910, a first search of the CAM for (908) 979-1035 generates matches on entries A, C and D (FIG. 8). Stage 920 then determines whether there are multiple matching entries, in which case all matching entries output the value of their priority fields simultaneously so that the logical OR function of the values can be computed, in stage 930. The logical OR of the values of the priority fields of entries A, C and D is "111". Since priority fields are encoded so as to contain only a single 1, it follows that "100" is the value of the highest priority field of any matching entry. The CAM is then searched for the combination of address (908) 979-1035 and priority field "100" in stage 940, generating a single matching entry A. Entry A is then retrieved from the CAM in stage 950.

Each time an entry is written into the CAM, both an entry value and a priority value are provided. Internal to the device, the priority value is expanded such that no priority value contains more than a single bit. This is accomplished by encoding P levels of priority as a $2^P$ binary values. For example, consider a device with four levels of priority from the user's point of view: "00", "01", "10", and "11". Internally, the priorities would be represented as: "0001", "0010", "0100", and "1000".

Figure 10A:
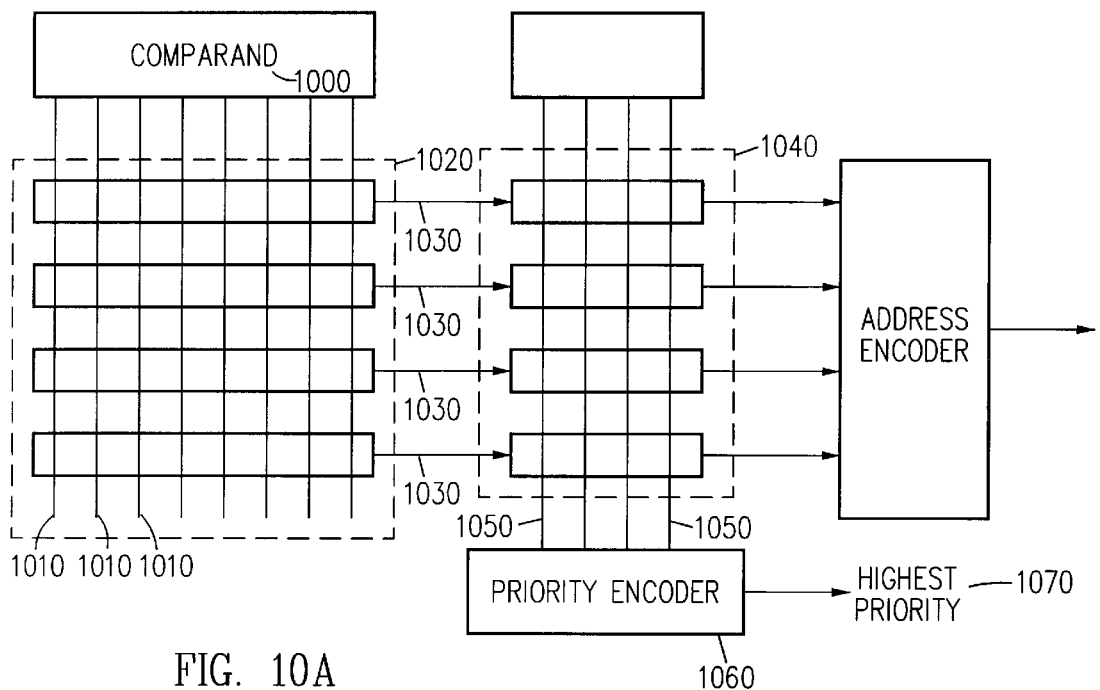
FIGS. 10A–10B are schematic diagrams of a circuit during the hierarchical address translation operation of FIG. 9.
Figure 10B:
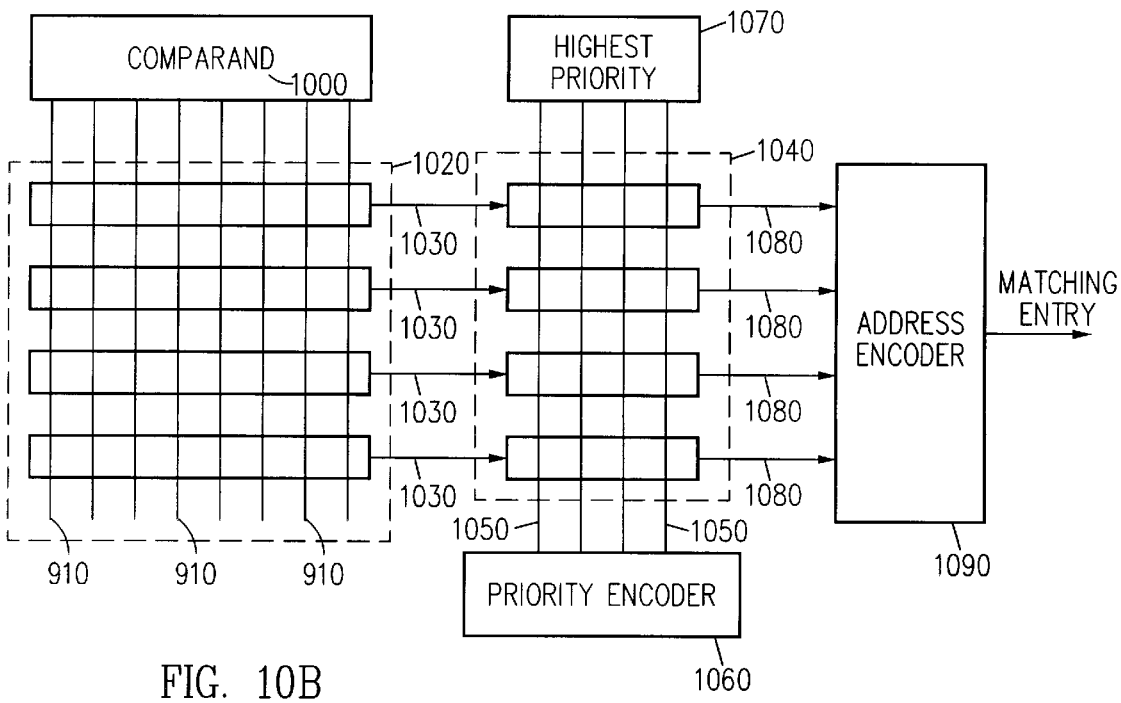

FIGS. 10A–10B illustrate a circuit for performing the operation of FIG. 9. FIG. 10A shows a first cycle of the operation of FIG. 9. A comparand 1000 (the address that is being searched for in the CAM) is used to drive the bit lines 1010 of the elements of CAM 1020. For illustrative purposes, only four elements of CAM 1020 are shown in FIGS. 10A–10B. However, the invention is not limited by any number of CAM elements and can be implemented using a CAM having an arbitrary number of elements. Any element of CAM 1020 that matches comparand 1000 asserts its match line 1030 and enables an associated priority CAM 1040. Any other suitable type of memory such as an SRAM can be used in place of priority CAM 1040. All enabled entries of priority CAM 1040 assert their priority values on read lines 1050 indicating that the entries match the address. If multiple matches with different priorities are found, priority encoder 1060 is used to select the highest priority value. For example, assume that the matching entries have priorities of "0100" and "0010". The output of the logical OR function of the priority values is "0110". Priority encoder 1060 then determines that highest priority 1070 is "0100" and the first cycle of the operation of FIG. 9 terminates.

FIG. 10B shows the second cycle of operation of FIG. 9. In this cycle, both comparand 1000 and highest priority 1070 are input into the CAM. For the entries (usually one) that match both comparand 1000 and highest priority 1070, the appropriate match line 1080 is enabled and address encoder 1090 outputs the address of the matching entry of CAM 1020. Although a two-cycle operation has been described for simplicity, the operation can be performed in one cycle. For example, multiple operations of FIG. 9 can be pipelined so that cycle 1 of a first operation is performed simultaneously with cycle 2 of a second operation, allowing CAM 1000 to perform operations at a rate of one cycle per operation.

According to a further embodiment of the invention, N−1 bits are used to represent N priority levels of the address rather than N bits. This is achieved by encoding the highest priority level as all 0s. If a match occurs and the output of the logic OR circuit is all 0s, the match has the highest priority field.

Figure 11:
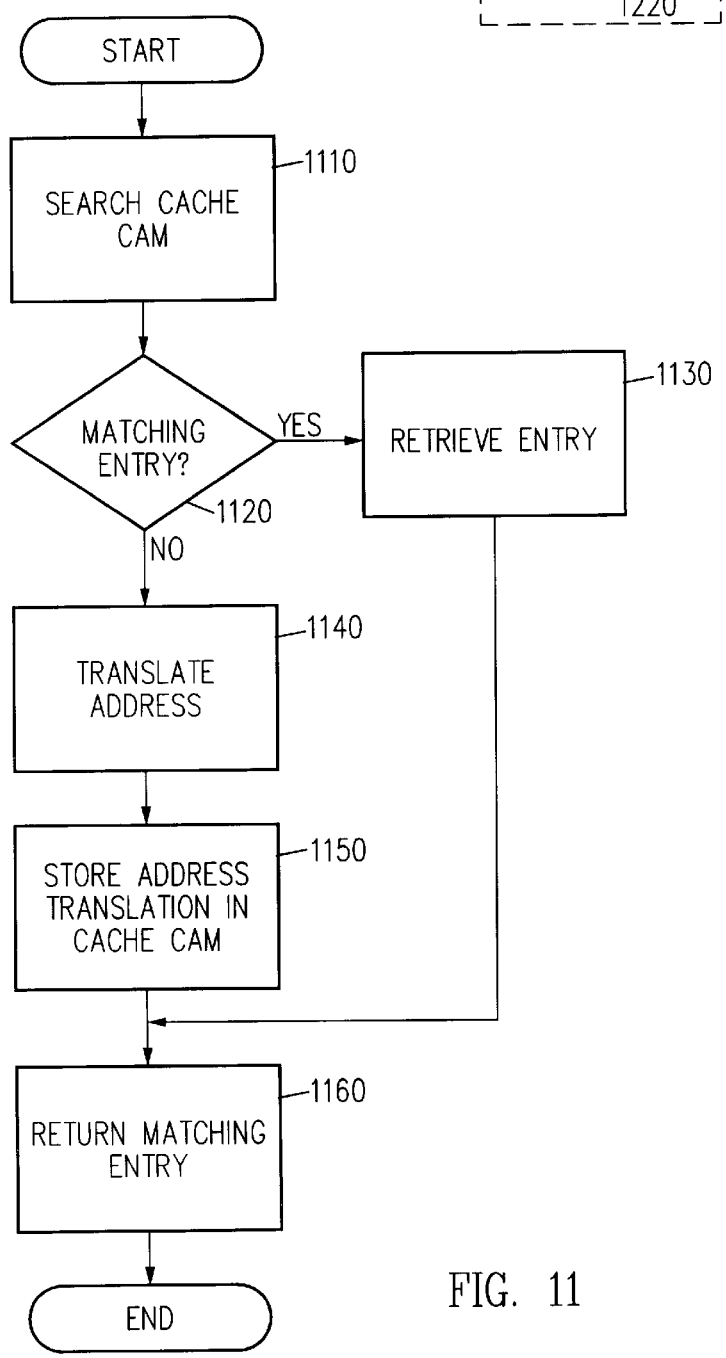
FIG. 11 is a flow diagram of a hierarchical address translation operation using a cache CAM, according to one embodiment of the invention.

According to a further embodiment of the invention, a CAM is used to cache the results of previous hierarchical address translations as flat or hierarchical addresses, as illustrated by the flow diagram of FIG. 11. FIG. 11 illustrates the process of performing an address translation according to one embodiment of the invention. When a packet arrives, the CAM is checked for the address in stage 1110. If the address is found in stage 1120, the associated data is retrieved form the CAM in stage 1130 and the operation proceeds with stage 1160. If the address is not found, a hierarchical address translation, according to any technique known in the art or described herein, is performed in stage 1140. The hierarchical address and the results of the address translation are then stored in the CAM in stage 1150. Finally, the results of the translation are made available for packet processing in stage 1160. The advantage of this approach is that once an address has been translated, packet processing can proceed at a higher speed than the native speed of the hierarchical address translation technique employed, since the translation data can simply be retrieved from the CAM. This technique is particularly advantageous in applications in which a limited number of addresses is repeatedly translated.

Figure 12:
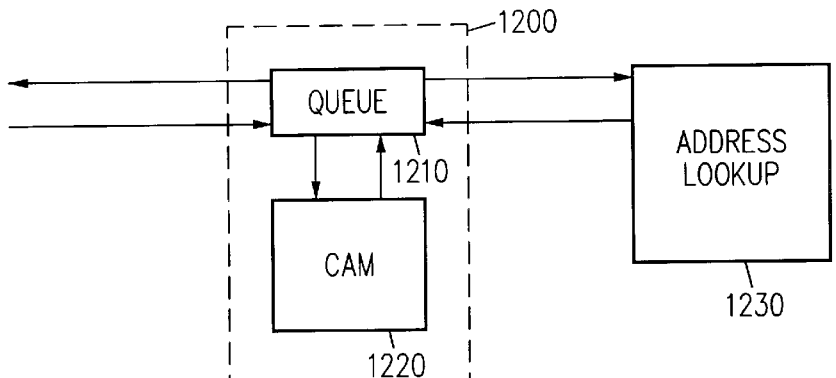
FIG. 12 is a block diagram of a circuit during the hierarchical address translation operation of FIG. 11.

FIG. 12 shows a circuit that can be used to implement the operation of FIG. 11. In FIG. 12, cache module 1200 comprises a queue 1210 and a CAM 1220. CAM 1220 can be either a binary or a ternary CAM. Cache module 1200, in turn, communicates with address lookup module 1230. During an address translation operation, an address is queued on queue 1210. Queue 1210, in turn, processes lookups of CAM 1220. If the lookup of CAM 1220 does not return a matching entry, the address is provided to address lookup module 1230. Lookup module 1230 then translates the address and the result of the address translation is stored in CAM 1220. After the translated address is stored in CAM 1220, subsequent translations of that address can thus be performed simply by a lookup of CAM 1220.

Unlike prior art techniques that required that the CAM store all known hierarchical addresses, this embodiment of the invention requires that the CAM store only addresses that are currently active. Entries in the CAM may be timestamped to allow removal of inactive entries to minimize the size of the CAM. The timestamp indicates the time at which the entry has been most recently accessed. If the entry has not been accessed recently, it becomes a candidate for removal from the CAM.

Since the CAM is used to cache the results of previous hierarchical address translations, care must be taken to ensure that if a table entry is modified (i.e., the address translation for an address changes) the modification is reflected in the entry stored in the CAM. As a result, this approach is particularly advantageous for applications in which hierarchical table entries do not change over time, such as a network routing table. However, several techniques can be used to handle table updates in applications in which table entries change more often. A first approach consists of flushing the contents of the CAM whenever a new table arrives. While this approach guarantees that all addresses are always processed correctly, this approach is probably more drastic than required. An alternative approach consists of comparing the new table and the old table in the background, and updating the affected CAM entries on an as-needed basis. Using this approach the CAM may be temporarily out of date during background processing of table updates; however this method is advantageous for applications in which table entries are updated infrequently, as it limits the overhead caused by updating the entries. Yet another approach consists of performing table lookups in parallel with CAM lookups. If packets are arriving at a modest speed, the CAM is updated continuously. During periods of heavy traffic, the CAM may fall out of step as table lookup falls behind. However, for applications in which data traffic is bursty, this approach represents a good compromise, as it allows the CAM to be updated between bursts of traffic, thereby limiting the overhead caused by the updates.

FIGS. 13–16 illustrate applications that take advantage of the hierarchical address translation techniques described above.

Figure 13:
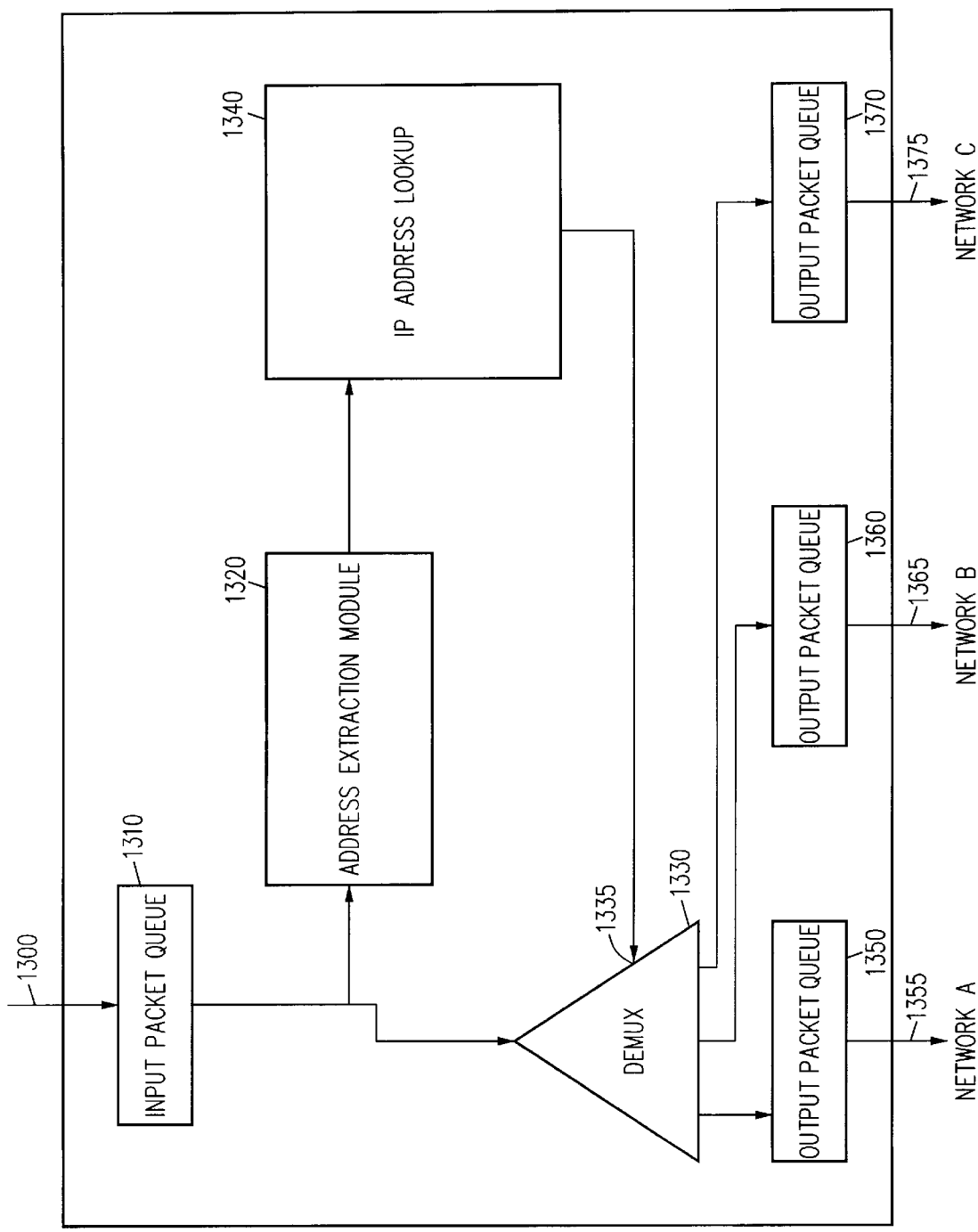
FIG. 13 is a block diagram of an IP router circuit, according to one embodiment of the invention.

FIG. 13 illustrates an internet protocol datagram router, according to one embodiment of the invention. Data packets transmitted over the internet are typically routed through a chain of network routers in between their origin and destination. Each router receives the packet and translates its destination address into the address of the next router in the chain to which the packet is to be transmitted.

A packet received over a network connection 1300 is initially stored in input packet queue 1310. The packet is then routed to address extraction module 1320 and to an input line of demultiplexer 1330. Address extraction module 1320, in turn, extracts a portion of the packet representing an address to which the packet is to be routed. The address extracted by address extraction module 1320 is then routed to IP address lookup 1340. IP address lookup 1340 is an apparatus for performing hierarchical address translation according to an embodiment of the invention. The contents of an entry stored in IP address lookup 1340 and matching the address is then routed to a control port 1335 of demultiplexer 1330. Demultiplexer 1330 routes the packet received from input packet queue 1310 to one of output packet queues 1350, 1360 or 1370 depending on the signal received from IP address lookup 1340. The output queue in which the packet is stored, in turn, routes the packet to the one of networks 1355, 1365 or 1375 to which it is connected.

Figure 14:
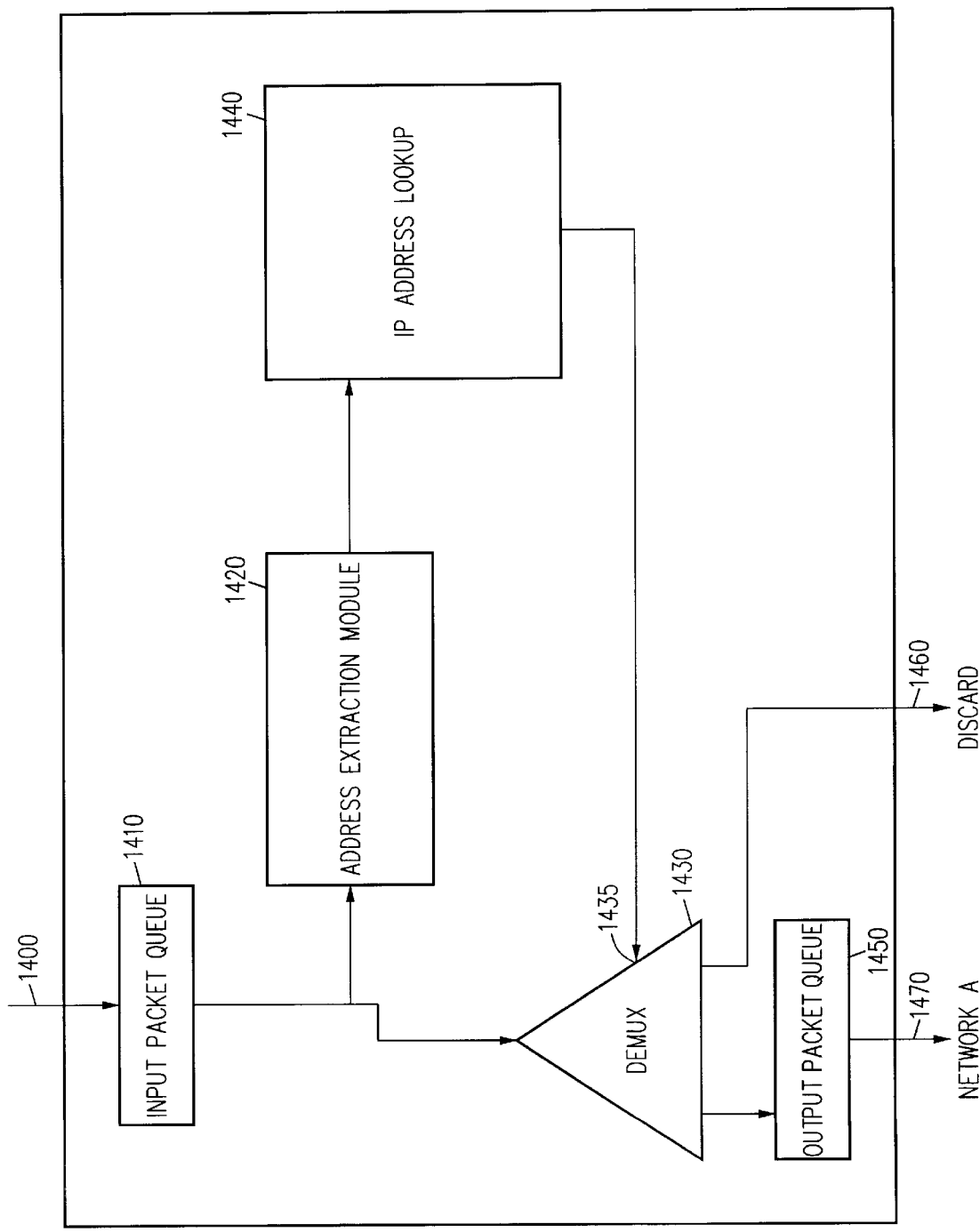
FIG. 14 is a block diagram of a network firewall circuit, according to one embodiment of the invention.

FIG. 14 illustrates a network firewall device according to one embodiment of the invention. Network firewalls are circuits used to allow data packets to be transmitted only to certain destination and to discard packets being transmitted to other destinations.

A packet received over a network connection 1400 is initially stored in input packet queue 1410. The packet is then routed to address extraction module 1420 and to an input line of demultiplexer 1430. Address extraction module 1420, in turn, extracts a portion of the packet representing an address to which the packet is to be routed. The address extracted by address extraction module 1420 is then routed to network address lookup 1440. Network address lookup 1440 is an apparatus for performing hierarchical address translation according to an embodiment of the invention. The contents of an entry stored in network address lookup 1440 and matching the address is then routed to a control port 1435 of demultiplexer 1430. Demultiplexer 1430 routes the packet received from input packet queue 1410 to either output packet queue 1450 or to discard line 1460 depending on the signal received from network address lookup 1440. Output packet queue 1450, in turn, routes the packet to network 1470 to which it is connected.

Figure 15:
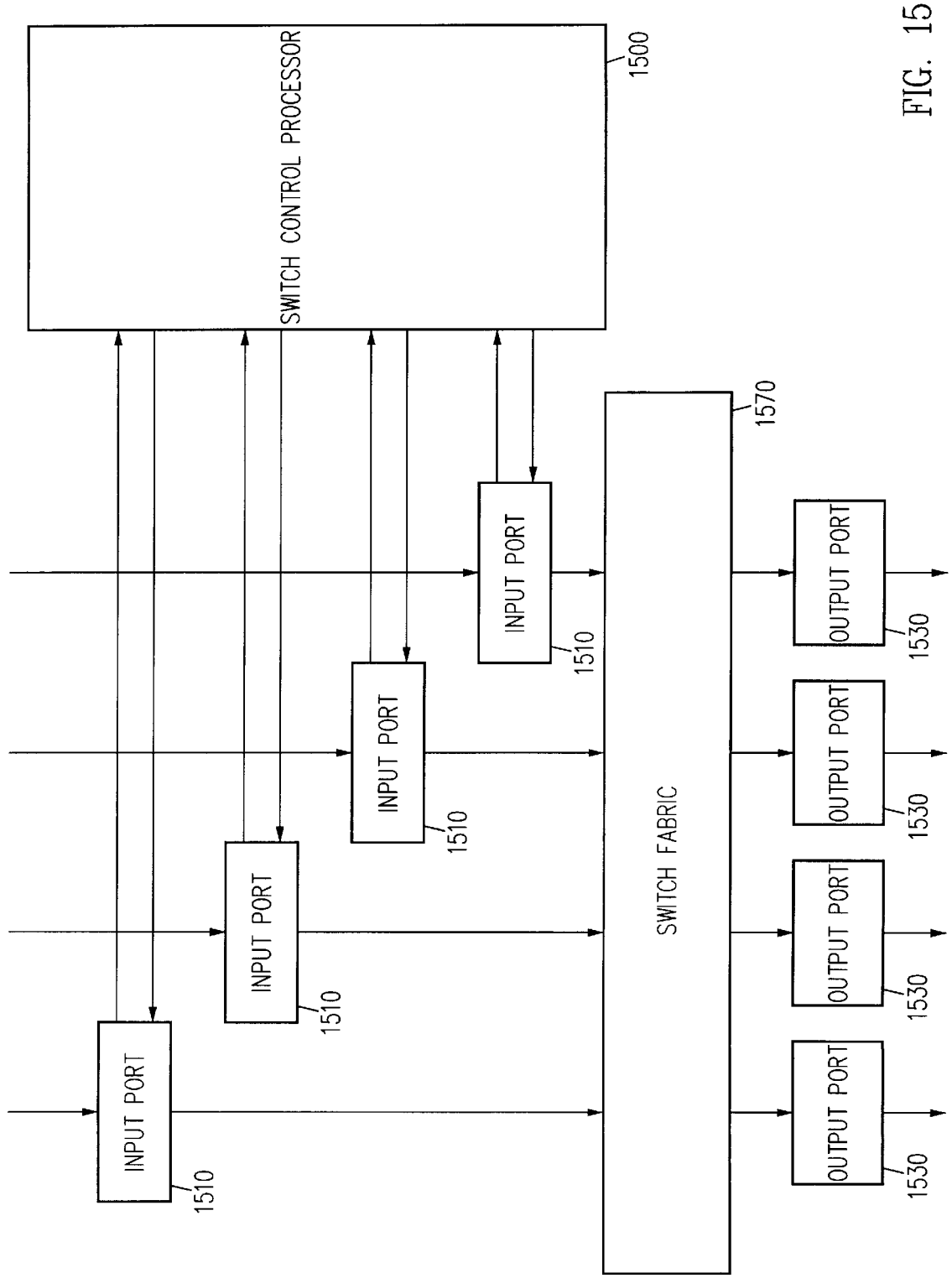
FIG. 15 is a block diagram of a network switch circuit, according to one embodiment of the invention.
Figure 16:
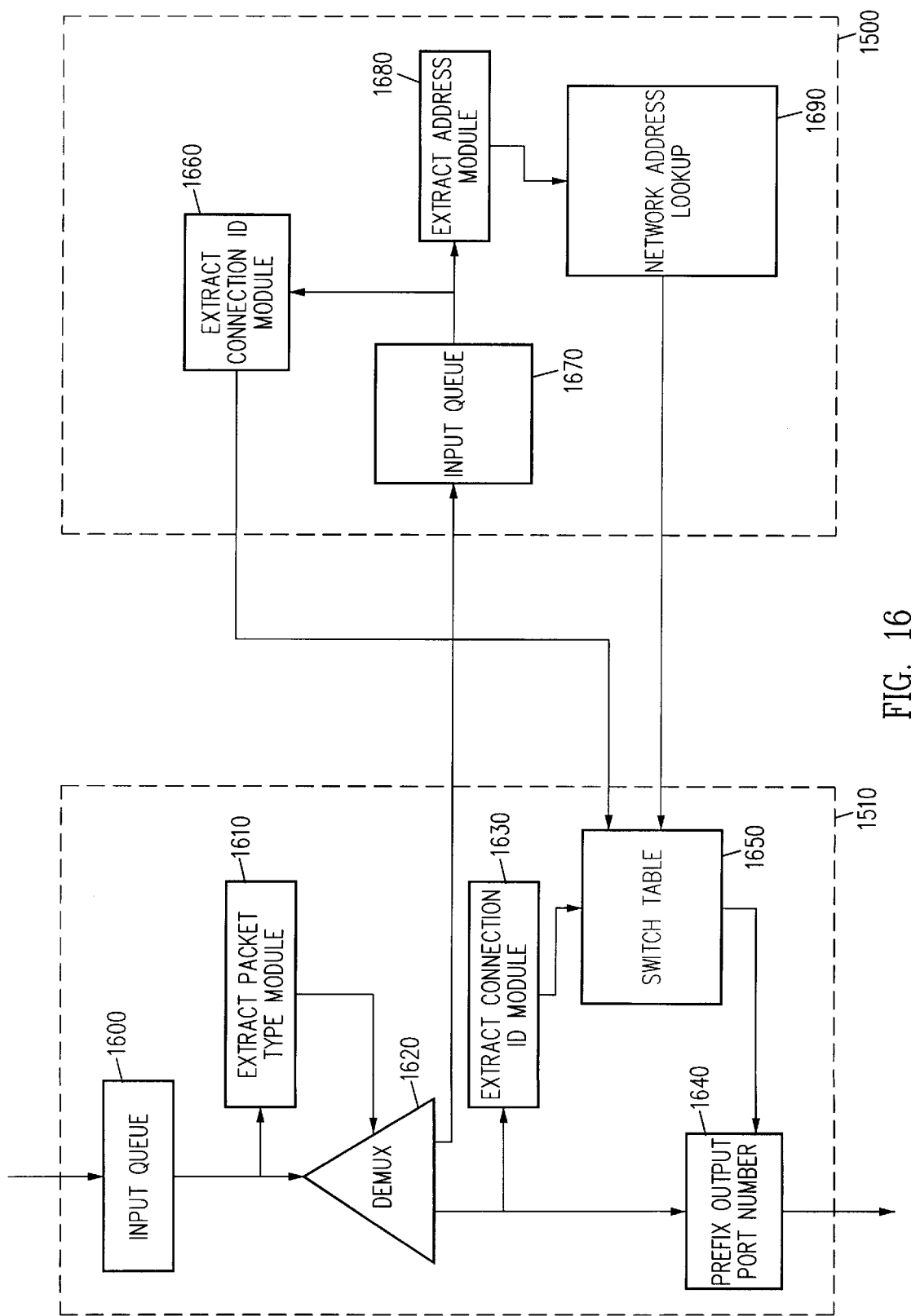
FIG. 16 illustrates an input port and a switch control processor element of the circuit of FIG. 15 in greater detail.

FIGS. 15–16 illustrate a network switch according to one embodiment of the invention. A network switch is a circuit used to route a data packet transmitted by one device connected to the network to a second device connected to the network. Network switches may be used to dynamically change the routing of data packets in between their origin and destination to evenly distribute network traffic.

In FIG. 15, a switch control processor 1500 is connected to a plurality of input ports 1510 (of which only four are shown for clarity) and to a switch fabric 1520. Input ports 1510 are connected to a set of input lines of switch fabric 1520. A set of output ports of switch fabric 1520, is in turn connected to a plurality of output ports 1530.

FIG. 16 illustrates one of input ports 1510 and switch control processor 1500 in greater detail. Input port 1510 comprises an input queue 1600 connected to an extract packet type module 1610 and to a demultiplexer 1620. Extract packet module 1610 controls which output line of demultiplexer 1620 the packet is routed to. If the packet type is a signalling packet, the packet is routed to input queue 1670 of switch control processor 1500. Otherwise, the packet is routed to extract connection ID module 1630 and to prefix output port number module 1640. Extraction connection ID module 1630 extracts a connection ID from the packet and routes it to switch table 1650.

Switch control processor 1500, in turn, comprises an input queue 1670 connected to an extract connection ID module 1660 and to an extract address module 1680, which is in turn connected to a network address lookup 1690. Extract connection ID module 1660 extracts a connection ID from the packet and routes it to switch table 1650 of input port 1510. Extract address module 1680 extracts an address from the packet and routes it to network address lookup 1690. Network address lookup 1690 is an apparatus for performing hierarchical address translation according to an embodiment of the present invention. Network address lookup 1690 translates the address received from extract address module 1680 into an output port number which is routed back to switch table 1650 of input port 1510. Switch table 1650 is a device for performing flat address translation of connection IDs to output port numbers. The output port number is stored in switch table 1650 and then routed to prefix output port number module 1640. Finally, prefix output port number module 1640 prepends (i.e., inserts in front of the packet) the output port number to the packet and routes it to the switch fabric 1520 (FIG. 15). Switch fabric 1520 then routes the packet to the appropriate output port 1530, depending on the value of the packet received from input port 1510.

Embodiments described above illustrate but do not limit the invention. In particular, the invention is not limited by any particular hardware implementation. Any suitable technique can be used for implementing CAMs. In addition, the invention is not limited to any specific size of the CAM. While a hardware implementation of the embodiments of the present invention has been described for clarity, the embodiments can be implemented using any combination of software and hardware. For example, some embodiments are implemented by a programmed computer executing the operations of FIGS. 5, 9 and 11. Other embodiments and variations are within the scope of the invention, as defined by the following claims.

We claim:

1. A method for translating a hierarchical address, the method comprising:

converting a plurality of ternary table entries into a plurality of binary table entries, wherein each binary entry comprises a binary address and a binary priority mask, the binary priority mask representing a hierarchical level of the entry;

storing the binary addresses of the plurality of binary table entries in a binary content addressable memory so that a first binary address having a first number of trailing zeros is retrieved from the memory before a second binary address having a second number of trailing zeros, wherein the first number is greater than the second number;

searching the memory for one or more entries matching the address by performing a binary search of the priority masks used in searching the memory; and retrieving an entry matching the address.

2. The method of claim 1, wherein the entry matching the address is a first entry in a list of entries matching the address.

3. The method of claim 1, wherein the plurality of ternary table entries is converted into the plurality of binary table entries by:

duplicating each digit of the ternary entry having a one or a zero value into a corresponding digit of an address of the binary entry;

replacing each digit of the ternary entry having a one or a zero value with a one value in a corresponding digit of a priority mask of the binary entry; and replacing each digit of the ternary entry having a don't care value with a zero value in a corresponding digit of an address and into a corresponding digit of a priority mask of the binary entry.

4. The method of claim 1, wherein the binary search is performed by:

performing an initial search of the memory for an address and a priority mask representing a median hierarchical value of all priority masks stored in the binary content addressable memory;

upon determining that the initial search generated multiple matching entries, repeatedly searching the memory for the address with a priority mask representing a hierarchical value that is one level higher than a priority mask used in an immediately previous search until the search generates no more than one matching entry;

upon determining that an immediately previous search generated no matching entries, repeatedly searching the memory for the address and a priority mask representing a hierarchical level that is one level lower than a priority mask used in an immediately previous search until the search generates at least one matching entry.

5. A method for translating a hierarchical address, the method comprising:

storing a plurality of ternary table entries in a ternary content addressable memory, each table entry comprising an address and a priority field, the priority field representing a hierarchical level of the entry;

searching the memory for one or more entries matching an address;

routing a priority field of entries matching the address to a priority encoding circuitry;

determining in the priority encoding circuitry that a priority field of an entry has a lowest hierarchical level of the entries matching the address;

searching the memory for the address and the priority field of the entry having the lowest hierarchical level of the entries matching the address; and retrieving an entry matching the address.

6. The method of claim 5, wherein the matching entry is a first entry in a list of entries matching the address.

7. An apparatus for translating a hierarchical address comprising:

a binary content addressable memory storing a plurality of table entries, the memory receiving as inputs an address and a priority mask and generating as output a value of one or more data entries stored in the memory;

circuitry for storing a value of a plurality of priority masks, wherein each value of a priority mask is individually addressable;

circuitry for addressing a value of a priority mask; and a controller causing different priority fields to be routed to the memory for a search depending on a result of a previous search;

wherein a search of the table entries stored in the memory is performed by performing a binary search of the priority masks used in searching the memory.

8. The apparatus of claim 7, wherein the apparatus is part of an internet protocol router circuit.

9. The apparatus of claim 7, wherein the apparatus is part of a network firewall circuit.

10. The apparatus of claim 7, wherein the apparatus is part of a network switch.

11. An apparatus for translating a hierarchical address comprising:

a ternary content addressable memory storing a plurality of table entries, each entry comprising an address and a priority field, the ternary content addressable memory receiving a search address as an input and generating a value of one or more data entries stored in the ternary content addressable memory as an output;

a memory for storing a value of the entries generated by the ternary content addressable memory;

a priority encoder receiving as an input a priority field of one or more table entries stored in the ternary content addressable memory and generating as an output a highest priority field of the input priority fields; and an address encoder receiving as an input an address of one or more table entries stored in the ternary content addressable memory and generating as an output a value of an entry having the highest priority field of the priority fields received as inputs by the priority encoder.

12. The apparatus of claim 11, wherein the apparatus is part of an internet protocol router circuit.

13. The apparatus of claim 11, wherein the apparatus is part of a network firewall circuit.

14. The apparatus of claim 11, wherein the apparatus is part of a network switch.

15. A method for filtering a hierarchical address, the method comprising:

converting a plurality of ternary table entries into a plurality of binary table entries, wherein each binary entry comprises a binary address and a binary priority mask, the binary priority mask representing a hierarchical level of the entry;

storing the binary addresses of the plurality of binary table entries in a binary content addressable memory so that a first binary address having a first number of trailing zeros is retrieved from the memory before a second binary address having a second number of trailing zeros, wherein the first number is greater than the second number; and searching the memory for one or more entries matching an address to determine whether the address is stored in the memory by performing a binary search of the priority masks used in searching the memory.

16. A method for filtering a hierarchical address, the method comprising:

storing a plurality of ternary table entries in a ternary content addressable memory, each table entry comprising an address and a priority field, the priority field representing a hierarchical level of the entry;

searching the memory for one or more entries matching an address;

routing a priority field of entries matching the address to a priority encoding circuitry;

determining in the priority encoding circuitry that a priority field of an entry has a lowest hierarchical level of the entries routed to the priority encoding circuitry; and searching the memory for the address and the priority field of the entry having the lowest hierarchical level of the entries routed to the priority encoding circuitry to determine whether the address is stored in the memory.

* * * * *